Nov. 7, 1950 C. A. ABLETT 2,528,987
BALL AND ROLLER BEARING
Filed Dec. 4, 1947 2 Sheets-Sheet 2
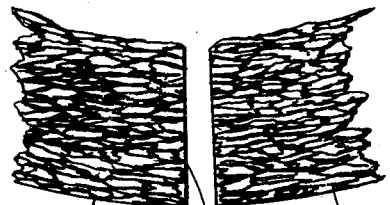
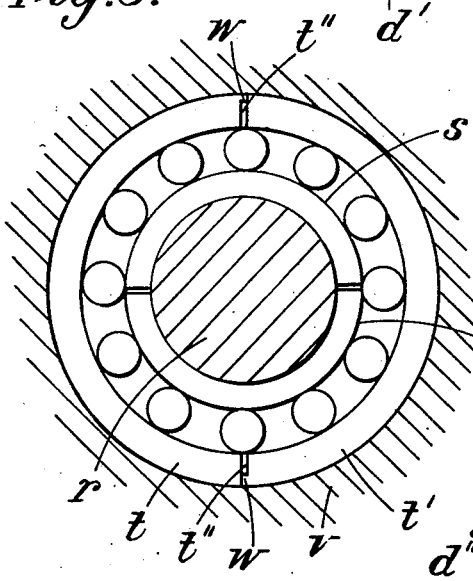
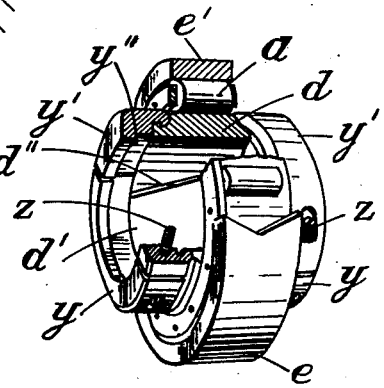
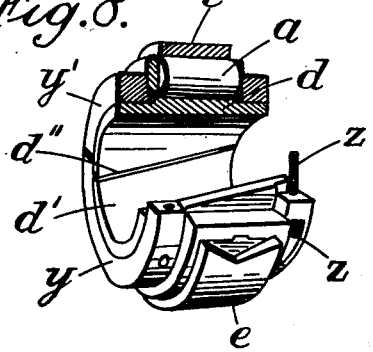
Inventor
Charles Antony Ablett
Cameron, Kerkam + Sutton
Attorneys Patented Nov. 7, 1950

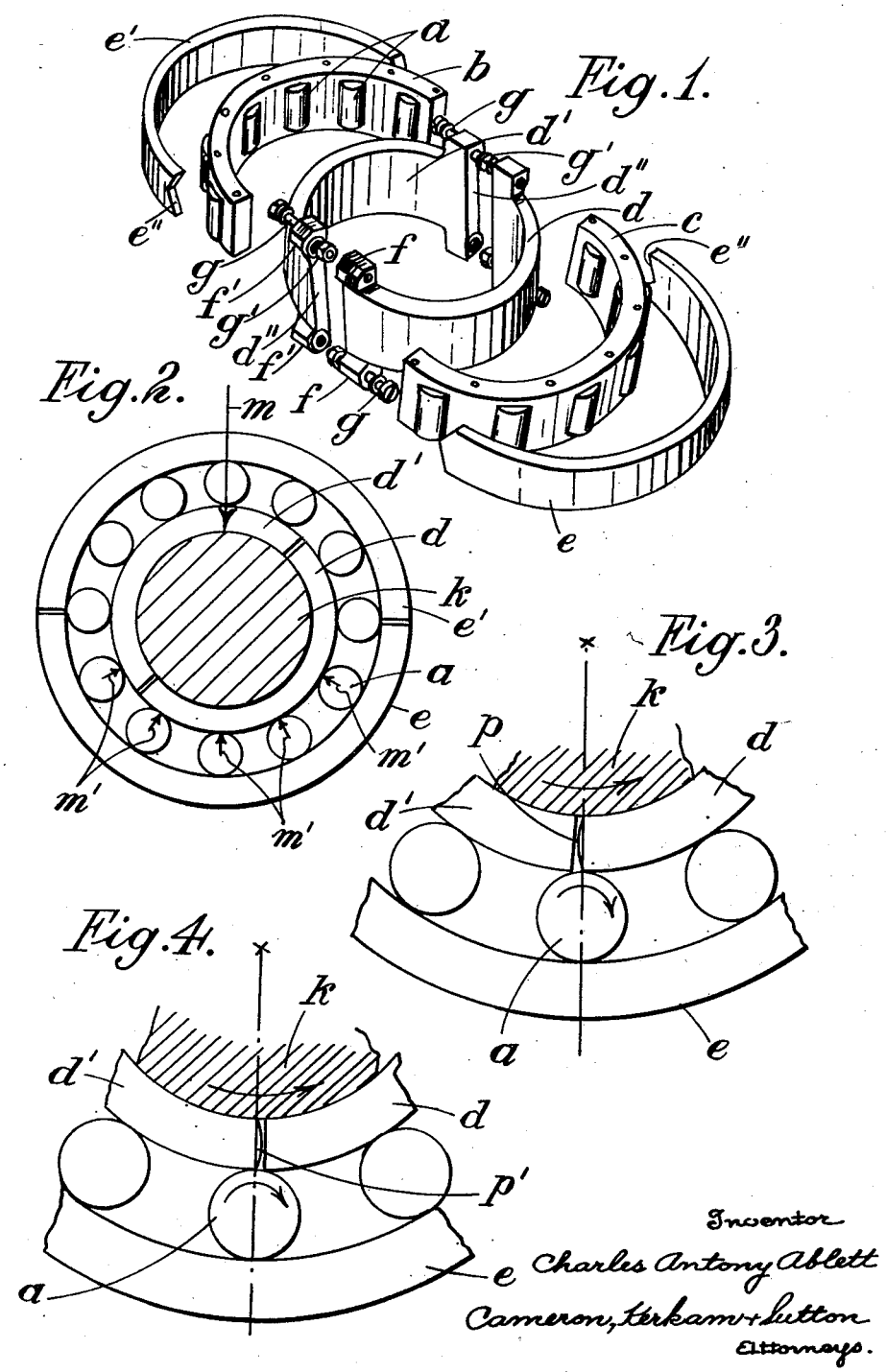

2,528,987

UNITED STATES PATENT OFFICE 2,528,987

BALL AND ROLLER BEARING

Charles Antony Ablett, Norfolk, England

Application December 4, 1947, Serial No. 789,614
In Great Britain May 11, 1940

6 Claims. (Cl. 308—216)

This invention relates to ball and roller bearings and more particularly to the races that are used therein. This application is in part based on British Patent Application No. 8510/40 dated May 11, 1940, on which British Patent No. 543,180 was issued.

The invention is particularly applicable to ball and roller bearings such as are used for shafting, axle boxes and the like and to the bearings used for, or adapted for use in, gun mountings, torpedo-tube mountings, searchlight mountings, range-finder mountings and the like.

It is an object of the invention to provide improved ball and roller bearings of the type in which the inner or outer race or both are split.

The invention includes a ball or roller bearing comprising, in combination, an outer race, a row of rolling anti-friction members such as balls or rollers working therein, an inner race in at least two sections, disposed circumferentially end to end, each made of strip bent so that the grain-formation follows the curvature of the race, the inner race sections being slightly shorter circumferentially than suffices to complete the whole circumference of the circle which they fit so as to leave narrow gaps between them where they approach one another, and screw-tightened clamping means bridging the joints between the race sections for the purpose of clamping the race sections around a shaft.

Alternatively, or in addition, the outer race may be made in sections, gaps being left in the raceway of the outer race where the sections approach one another.

Examples of constructions in accordance with the invention will now be described with reference to the accompanying drawings, in which:

Figure 1 is an "exploded" perspective view of a roller bearing in accordance with the invention, Figure 2 is a diagram of a ball or roller bearing indicating the manner in which the load on the bearing is divided between the balls or rollers, Figure 3 is a diagram of the lower part of a bearing in accordance with the invention illustrating the action of the parts in use, Figure 4 is a diagram similar to Figure 3 illustrating another stage of the action, Figure 5 is a diagram illustrating the disposition of the grain-structure in the raceway, Figure 6 is a diagram of an alternative construction of bearing, and Figure 7 is a perspective view illustrating an alternative means of securing the parts to that shown in Figure 1.

Figure 8 is a view similar to Figure 7 of a further alternative construction.

Referring to Figure 1, the rollers $a$ are mounted in position in a split cage made up of two parts $b$ and $c$. An inner race is indicated at $d$, $d'$, this being made in two parts with the division faces $d''$ extending obliquely so as to afford a gradual passage of the rollers $a$ from one part of the race to the other over the joints. The outer race is indicated at $e$, $e'$, the faces $e$ of the material of the races at the joints between the two parts being of "bird-mouth" formation to afford a gradual passage of the rollers over the joint. In accordance with the invention each of such raceways is made from rolled strip, bar or skelp of low carbon, high carbon, carburised or alloy steel which is bent or otherwise caused to assume a curved or substantially semi-cylindrical form and is then hardened and ground.

The inner raceway $d$, $d'$ is provided with lugs $f$, $f'$ at the corners by the faces $d''$ and through the lugs pass screws $g$ which carry nuts $g'$, the nuts $g'$ serving, when the parts are assembled, to draw the lugs $f$ toward the lugs $f'$ and hold the race firmly upon the shaft on which the bearing is to run, the interior of the raceway $d$, $d'$ being ground to fit the shaft.

The two halves or the inner race sections are made slightly shorter circumferentially than suffices to complete the whole circumference of the circle which they fit so that when they are clamped by the screws $g$ upon the shaft narrow gaps are left between the races at the joints where they approach one another. The race members $d$, $d'$ are made from steel stock which has been bent to a semi-cylindrical form as already described before machining away the metal to leave the lugs $f$, $f'$, and as a result the grain of the metal extends circumferentially around the race and the end grain of the metal runs into the gaps at the meeting faces $d''$. This can be seen from the diagram, Figure 5, which is a reproduction of a metallographic section of the metal and shows the way in which the elongated or deformed crystals which constitute the "grain" of the metal run endwise into the faces $d''$. This is an important feature of the invention taken in conjunction with the gaps as will now be more fully explained.

Referring to Figure 2, this shows a shaft $k$ on which are secured the race members $d$, $d'$, running within the outer race members $e$, $e'$, with the rollers $a$ between them. If the load on the shaft is represented by the arrow $m$ the pressure by which this load is supported is represented by the arrows $m'$ between each of the lowermost rollers in the race and the inner race way, and it will be seen that in the case supposed the load is shared between five rollers. As the inner race rotates with the shaft $k$ the gaps between the two halves of the race pass each of the five rollers successively in the manner indicated in Figures 3 and 4. Figure 3 shows the roller $a$ at the moment when the trailing edge of the inner race member $d$ is just about to leave it. In these circumstances the load which is borne by the roller $a$ is bearing on the corner of the trailing edge of the race way and if there were no gap between the parts $d, d'$, owing to the joint between the two halves of the race way there would be an excessive stress on the metal at this point which would lead to crumbling of the metal at the corner. In fact, however, owing to the slight gap which is left between the parts $d, d'$, the metal of the race $d$ is free to bulge into the gap, as is indicated in a grossly exaggerated way by the curved line $p$. In other words the metal at the corner at the moment when the roller is bearing upon it, being free to yield into the gap, gives way a little and the load on the roller is decreased, the load thus relinquished being shared among the other rollers in the race way which are not over a gap and which momentarily bear a larger proportion of the total. Moreover, as the roller $a$ does not engage the whole width of the gap simultaneously because the meeting faces of the two halves of the race way are oblique, so that the transfer takes place gradually along the length of the roller, the roller $a$ is able to bear its full share of the load except at the portion which is passing directly over the gap.

When the roller crosses to the other side of the gap, as shown in Figure 4, the metal of the race way $d'$ is able to bulge a little, as shown at $p'$, and therefore the load on this corner of the race way is relieved.

It would not suffice to provide gaps alone, as the metal of the race way would still tend to disintegrate if the grain were running parallel with the axis of the shaft $k$, but owing to the fact that the grain of the metal is running into the gap as shown in Figure 5 of the drawing, the bulging at $p, p'$, which has been referred to, can take place without any tendency to disintegrate. Moreover, in this connection, it must be borne in mind that the race way members $d, d'$, are bedded firmly down on the shaft $k$ so that the metal of the race ways is firmly supported at the base of the gap upon the shaft and the other rollers of the race take up their momentarily increased share of the load smoothly on account of this firm supporting of the race members.

The firm support of the race members is moreover assisted by the fact that the screws $g$ hold the parts firmly on to the shaft and these screws are not liable to yield under the effects of centrifugal force.

Split races ordinarily have to be run at lower speeds or under lighter loads than solid races, but split races according to the present invention may be run at high speeds and under heavy loads with success, and the employment of the screws $g$ and nuts $g'$ to draw the parts together, rather than the employment of wedges, such as have been heretofore proposed, is found to be satisfactory at high speeds, whereas the wedges have been found to tend to slip out of place under high-speed operation.

For all these reasons the construction described is capable of being employed at high speeds and under heavy loads notwithstanding the fact that the race ways of the inner race are divided. Similarly the division of the outer race ways is satisfactory but, as will be realized, the problem of outer race ways being divided is not equally difficult because the joint between the two parts of the outer race way in the case where the outer race way is not rotating can be arranged to come at a point where there is no load on the rollers or balls of the bearing. The outer race ways $e, e'$, can therefore be made, if desired, without a gap such as the gap between the parts $d, d'$.

However, in the case where the outer race way rotates, the same considerations apply to it as those which have already been referred to in connection with the inner race ways. Figure 6 shows such an instance. In Figure 6 there is a fixed inner stub-shaft $r$ which carries non-rotating inner race ways $s, s'$, and rotating outer race ways $t, t'$, are provided which are secured in the hub $v$ of a heavy rotating member which the bearing is intended to support.

In this case, according to the present invention, at the junction between the outer race members $t, t'$, a gap is left at $t''$. To ensure the provision of this gap each of the members $t, t'$ may carry a small abutment $w$, or a shim or any other means may be provided to keep the halves of the outer race way apart at the joint.

Figure 7 shows a construction in which the inner race ways $d, d'$, instead of being provided with lugs, such as $f, f'$, are drawn firmly on to the shaft by being engaged with rings $y, y'$, constructed in halves and drawn together by screws $z$. The outer race ways $e, e'$ and rollers $a$ are the same as already described, and as before there is a gap between the meeting faces $d''$ of the race way members $d, d'$. The rings $y, y'$ are made to fit into grooves formed in the edges of the race members $d, d'$ and they are recessed as shown at $y''$ so that they bear hard on the shaft at their corners which are remote from the inner race way and the screws $z$, when tightened up, cause them to press firmly on to the rings $d, d'$ and force these rings tightly on to the shaft.

The construction shown in Figure 8 is similar to that of Figure 7, like parts being similarly lettered in the figure, but in Figure 8 the halves $y, y'$ of the clamping rings are rectangular in section and instead of fitting into grooves in the race-way members $d, d'$ they surround cylindrical portions of these members and the parts $y, y'$ have no part which bears directly on any shaft round which the bearing is fitted.

While the invention has been illustrated in connection with specific examples in which roller bearings are employed, it will be appreciated that it is equally applicable to ball bearings.

I claim:

1. A bearing comprising, in combination, an outer race, a row of rollers working therein, an inner race comprising at least two sections assembled circumferentially end to end to form the raceway, and screw-tightened clamping means bridging the joints between said sections for clamping them around a shaft, the combined inner race sections being slightly shorter circumferentially than required to complete the whole circumference of the raceway and being clamped in assembled position with narrow gaps between their adjacent ends, said sections being made of steel and their grain-formation throughout following the curvature of the race circumferentially.

2. A bearing as claimed in claim 1, said gaps extending in directions oblique to the axis of the bearing.

3. A bearing as claimed in claim 1, said race sections comprising rolled steel strip bent longitudinally to the curvature of the race.

4. A bearing as claimed in claim 1, said clamping means comprising clamping rings each in a plurality of circumferentially disposed parts and surrounding said race sections at each side of the race, and screws joining said parts.

5. A bearing comprising, in combination, inner and outer races and a row of rolling antifriction members between them, at least one of said races being divided into a plurality of sections assembled circumferentially end to end to form the raceway, and screw-tightened clamping means for securing the assembled sections in place, the combined sections being slightly shorter circumferentially than required to complete the circumference of the raceway and being secured in place with narrow gaps between their adjacent ends, said sections being made of steel and their grain-formation throughout following the curvature of the raceway circumferentially.

6. A bearing as claimed in claim 5, said race sections comprising rolled steel strip bent longitudinally to the curvature of the raceway.

CHARLES ANTONY ABLETT.

REFERENCES CITED

The following references are of record in the file of this patent:

UNITED STATES PATENTS

| Number | Name | Date |
| --- | --- | --- |
| 950,433 | Callahan | Feb. 22, 1910 |
| 955,120 | Lockwood | Apr. 12, 1910 |
| 964,322 | Shirley | July 12, 1910 |
| 1,059,839 | Cooper | Apr. 22, 1913 |
| 1,178,813 | Lloyd | Apr. 11, 1916 |
| 1,319,866 | Hegelman | Oct. 28, 1919 |
| 1,967,821 | Hess | July 24, 1934 |

FOREIGN PATENTS

| Number | Country | Date |
| --- | --- | --- |
| 116,553 | Australia | Feb. 8, 1943 |